(12) United States Patent
Rath et al.

(10) Patent No.: US 7,391,862 B2
(45) Date of Patent: Jun. 24, 2008

(54) COMMUNICATION UNIT

(75) Inventors: Klaus Rath, Gentofte (DK); Charles L. Pedersen, Virum (DK)

(73) Assignee: GN Netcom A/S (DK)

( * ) Notice: Subject to any disclaimer, the term of this patent is extended or adjusted under 35 U.S.C. 154(b) by 921 days.

(21) Appl. No.: 10/275,788

(22) PCT Filed: Apr. 30, 2001

(86) PCT No.: PCT/DK01/00288

§ 371 (c)(1),
(2), (4) Date: Jun. 12, 2003

(87) PCT Pub. No.: WO01/86923

PCT Pub. Date: Nov. 15, 2001

(65) Prior Publication Data
US 2004/0028218 A1    Feb. 12, 2004

(51) Int. Cl.
H04M 1/00 (2006.01)
H04M 9/00 (2006.01)

(52) U.S. Cl. .......................... 379/430; 379/431

(58) Field of Classification Search ............ 379/430, 379/433, 431
See application file for complete search history.

(56) References Cited

U.S. PATENT DOCUMENTS

| | | | |
|---|---|---|---|
| 4,654,883 A | 3/1987 | Iwata | |
| 4,688,262 A | 8/1987 | Schaefer et al. | |
| 4,897,873 A | 1/1990 | Beutler et al. | |
| 5,210,791 A | 5/1993 | Krasik | |
| 5,260,997 A | 11/1993 | Gattey et al. | |
| 5,359,647 A | 10/1994 | Regen et al. | |
| 5,504,812 A | 4/1996 | Vangarde | |
| 5,708,724 A | 1/1998 | Burris et al. | |
| 5,708,725 A | 1/1998 | Ito | |
| 5,787,166 A | 7/1998 | Ullman | |
| 5,793,865 A | 8/1998 | Leifer | |

(Continued)

FOREIGN PATENT DOCUMENTS

DE    29808425    9/1998

(Continued)

OTHER PUBLICATIONS

Ericsson Bluetooth Wireless Headset, Photo (Web site).

*Primary Examiner*—Rasha S. Al-Aubaidi
(74) *Attorney, Agent, or Firm*—Altera Law Group, LLC

(57) ABSTRACT

Communication unit comprising a house in which at least one transducer is placed, and on which a microphone arm is suspended. The housing also has an ear hook for fastening the communication unit to the head of a user. The microphone arm is pivotally connected to the housing by a hinge link at an outer area of the housing, and so that the microphone arm can be moved between a position in which it lies up against the housing, and a position in which it extends away from the housing. The microphone arm has a length, which in the main is less than or of the same order as the greatest extent of the housing, so that in the folded-in state the microphone arm does not project out over the circumference of the housing. The communication unit can be used on both the right and the left side of the head, in that the ear hook can be suspended in two different positions.

18 Claims, 5 Drawing Sheets

U.S. PATENT DOCUMENTS

Figure 1:
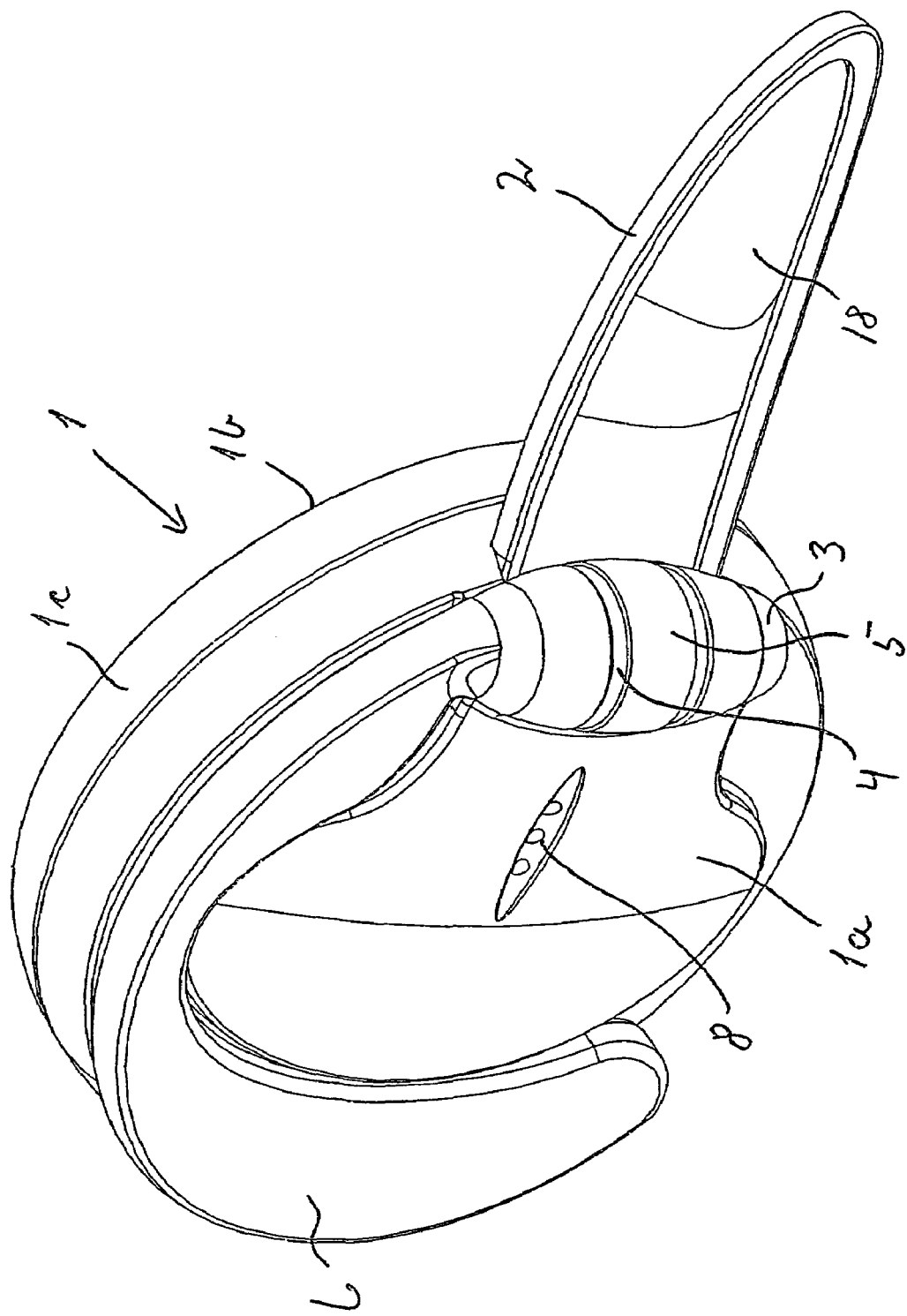

| | | |
|---|---|---|
| 5,793,878 A | 8/1998 | Chang |
| 6,016,347 A | 1/2000 | Magnasco et al. |
| 6,047,076 A | 4/2000 | Yang |
| 6,052,567 A | 4/2000 | Ito et al. |
| 6,055,312 A | 4/2000 | Pralus et al. |
| 6,230,029 B1 | 5/2001 | Hahn et al. |
| 6,269,259 B1 | 7/2001 | Lai |
| 6,396,935 B1 | 5/2002 | Makkonen |
| 2002/0110249 A1 | 8/2002 | Jeon et al. |
| 2002/0164042 A1 | 11/2002 | Vonlanthen |

FOREIGN PATENT DOCUMENTS

| | | |
|---|---|---|
| DE | 29908529 | 8/1999 |
| GB | 2105856 | 8/2002 |
| WO | 01/37524 | 11/2000 |

COMMUNICATION UNIT

The invention concerns a communication unit which comprises a housing in which at least one transducer is placed, and on which a microphone arm is suspended, said housing also having means for securing the communication unit to the head of a user.

Such a communication unit is most often used in connection with telephony, where a telephone user who talks over the telephone often and/or engages in long telephone conversations, can use such a unit in the form of a headset or an earset without having to hold a handset. However, other uses also exist, such as in connection with mobile telephones and similar communication equipment.

Examples of known headsets or earsets are described, for example, in U.S. Pat. No. 5,787,166 A and U.S. Pat. No. 5,504,812 A. These publications disclose both configurations, which are provided with a relatively long microphone arm, which means that both of these constructions are relatively space demanding when they are not being used. It is true that the microphone arm on the headset in the last-mentioned publication can be turned upwards, so that it lies parallel with the housing and the head-piece, and whereby at the same time a switch function is activated, but still this known headset will be of considerable dimensions. It will thus not be expedient for users to transport these known headsets around with them when the headsets are not in use, the reason being that they cannot be placed in a pocket, a bag or the like without great difficulty.

A further earset is also known from DE 299 08 529 U, where the earset is configured as a round capsule with an ear hook and a relatively long microphone boom, this boom being configured in a flexible material. This microphone boom is wound up inside the capsule, from which it can be drawn out when it is to be used. Due to the flexible nature of the microphone boom, a precise positioning of the microphone and herewith an optimum sound reception can hardly be expected and, moreover, the microphone boom will easily be susceptible to physical influences.

DE 298 08 425 U, also describes a wireless earset. This known earset has a housing in the form of an ear shell which at its uppermost part has a projecting antenna, and which at its lower part has a microphone arm. This microphone arm consists of two link stays, which are hinged to each other. The one link stay supports a microphone at its free end, while the other link stay is secured to the housing in a pivotal and displaceable manner. When the earset is not in use, the microphone arm can be inserted into a guide in the housing, in that the two link stays are first folded together by a turning of the one link stay, so that the two link stays lie over each other, after which they are turned so that they lie in line with the guide, after which the link stays can finally be pushed into the guide in the housing.

What this known microphone arm thus involves is that it consists of a relatively complicated and herewith also a vulnerable mechanism, which comprises two hinge links and a linear guiding movement and herewith subsequent risk of damage during use. Moreover, the users of this known earset must make themselves familiar with a relatively complex procedure for taking the earset into use and its adjustment, in that the microphone arm must first be slid out of the guideway groove, after which the two link stays must be folded out, and finally after which a suitable position of use must be set by adjustment of the two hinges, i.e. partly the hinge between the two link stays and partly the hinge between the second link stay and the housing.

Finally, U.S. Pat. No. 6,055,312 discloses a communication unit having a headband connecting two speakers for producing sound to a user's ears. This headset is quite bulky and not adapted to be worn on a user's ear.

It is thus an object of the invention to provide a communication unit which, when it is not in use, only occupies very little space, which is easy to use, also for a user who is not familiar with the communication unit, and which is of a robust and operationally reliable construction.

This is achieved in that the communication unit disclosed in the preamble is configured in.

It is hereby achieved that in the first position, the microphone arm will not project outside the extent of the housing, but will lie up against and coincide with this, so that in its unused state the communication unit will not occupy a particularly great deal of space and, furthermore, it can easily be kept for example in a drawer, in a bag, in a pocket or other similar places. Moreover, with the disclosed configuration a relatively simple and robust hinging of the microphone arm to the housing is achieved, since what is involved is merely a single hinge link, so that the microphone arm can be folded out to the position of use in a simple manner.

With the embodiment as disclosed in claim 2, use is made of a particularly expedient hinging of the microphone arm to the housing, in that the microphone arm hereby moves in a plane which stands substantially at right-angles to or at an obtuse angle in relation to a side plane for the housing. The hinging can hereby be configured as a particularly robust construction. For example, it can be configured as disclosed in claim 3, by which embodiment it is achieved that the movement of the microphone arm is guided in an especially good manner, and that the hinging will be resistant to influences arising externally, such as shock, impact, jolting and the like.

As disclosed in claim 4, it can be expedient for a switch arrangement to be associated with the movement of the microphone arm, which can be used, for example, for coupling the communication unit electrically when the microphone arm is folded out, and conversely for switching off the communication unit when the microphone arm is folded in against the housing. This will be an advantage especially when the communication unit functions in a wireless manner, in that here it is especially necessary to prevent unnecessary current consumption, which can be achieved precisely with the disclosed configuration, where the current consumption will be cut off when the microphone arm is folded in, e.g. when it is taken off the user's head. It will thus not be necessary for the user to have to remember to switch off the communication unit by operating a separate switch button.

With a particularly expedient embodiment, such as disclosed in claim 5, a lock- or safety-arrangement can be associated with the microphone arm. It can hereby be ensured that the microphone arm will not unintentionally be moved away from the folded-together state, e.g. while it is being kept in a pocket, a bag, the glove compartment of a car or similar places of storage, which could otherwise have the effect that it will consume current, which as mentioned is a disadvantage, especially in connection with wireless configurations. The release arrangement can consist of a purely mechanical device which secures the microphone arm, and which when activated results in the fact that the microphone arm can be folded out. At the same time herewith, the microphone arm can thus activate a switch arrangement as mentioned above. However, the release arrangement can also consist of a mechanical device, which at the same time is coupled to a changeover switch or contact, so that an activation of the release arrangement not only releases the microphone arm but also couples the electrical circuits. Finally, the lock- or safety arrangement can consist of a bi-stable construction of the microphone arm and its suspension, so that the microphone arm, e.g. against a spring pressure, must be forced or moved away from the two stable positions, for example the fully folded-in and the fully folded-out position. It is not until the passage of an unstable point that the movement of the microphone arm becomes easier or possibly completely influenced, e.g. by a spring force, towards the second of the two stable positions. In this way it is similarly ensured that the microphone arm is not unintentionally moved away from the in-active state.

As characterised in claim 6, the communication unit can contain a microphone which can be placed either in the housing or in the microphone arm, in which latter case the electrical connections to a microphone built into the microphone arm can expediently be effected via the hinge link, in that parts of the hinge can possibly constitute or support electrical connections.

Furthermore, the communication unit can expediently be configured as disclosed in claim 7, whereby in connection with a wireless embodiment an antenna is established in association with the housing or in association with the microphone arm, so that it is avoided that a fixed antenna will project outside the extent of the housing when the communication unit is not in use. As disclosed in claim 8, the antenna can expediently consist of a coating on a surface in or on the housing or the microphone arm, for example on a side of the microphone arm, whereby a suitable antenna can be established in a relatively simple manner.

As disclosed in claim 9, the electrical connection to the antenna can be effected via the hinge link, for example by means of an electrically conductive coating on the hinge parts which abut up against each other or lie against each other in the position of use.

Moreover, the earhook, the ear ring or the like can be turned out from the housing, so that the ear hook or ear ring can easily grip around behind the ear when the communication unit is placed against the outer ear. When not in the position of use, the ear hook or the ear ring can also be turned in towards the housing where it can be disposed in a cut-out or recess, so that neither the ear hook nor the ear ring will project substantially outside the extent of the housing in the unused state. Thus, neither the means for securing the communication unit on the head of the user will constitute any hindrance to an easy storing of the communication unit in, for example, a pocket, a bag or similar places when it is not in use.

The communication unit can also be configured as disclosed in claim 11, so that there is free choice whether the communication unit is to be worn on the right or on the left ear, in that the user can carry out a changeover to the position in which the communication unit is desired to be worn in a relatively simple manner.

When the unit according to the invention is configured as disclosed and characterised in claim 12, it can signal whether a conversation is in progress or, alternatively, whether the unit is switched on or off. If use is made of a miniature light diode as light source, the current consumption is minimised. It can be of particular advantage if the unit is configured as disclosed and characterised in claim 13, in that it is hereby possible to position the signal device in the vicinity of the sound opening for the microphone or sound tube.

Moreover, when the unit according to the invention is configured as disclosed and characterised in claim 14, the light source will be protected and can illuminate or shine through the item when use is made of a transparent or partly transparent rubber, whereby a greater signal effect is achieved. At the same time herewith, the item can constitute a "soft" stop for the microphone arm when it is folded in.

Finally, the unit according to the invention can be configured as disclosed and characterised in claim 15. A more stable hinging of the ear hook is hereby achieved, and at the same time herewith an increased acoustic distance between the transducer and receiver is achieved, so that coupling is avoided.

Figure 2:
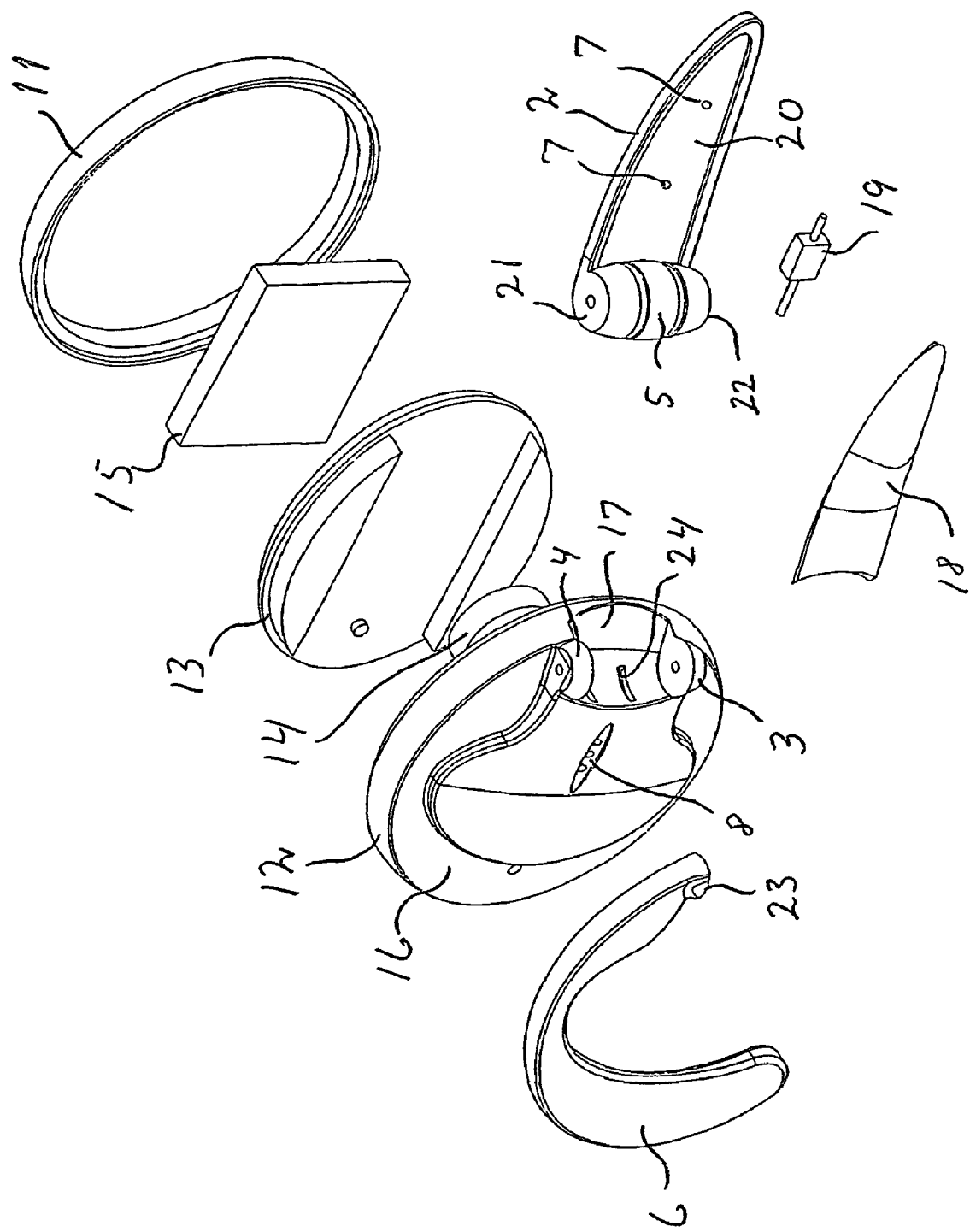
Figure 3:
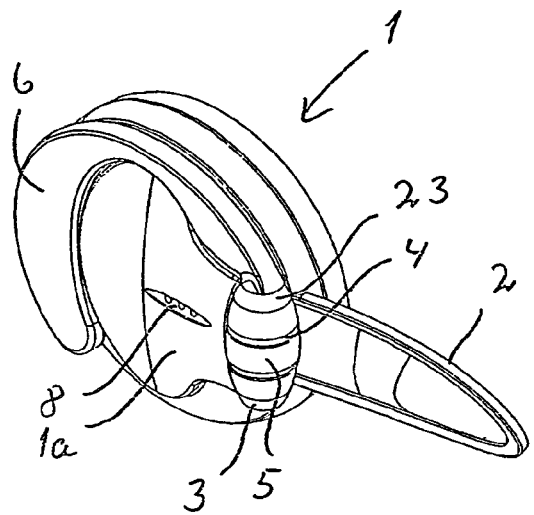
Figure 5:
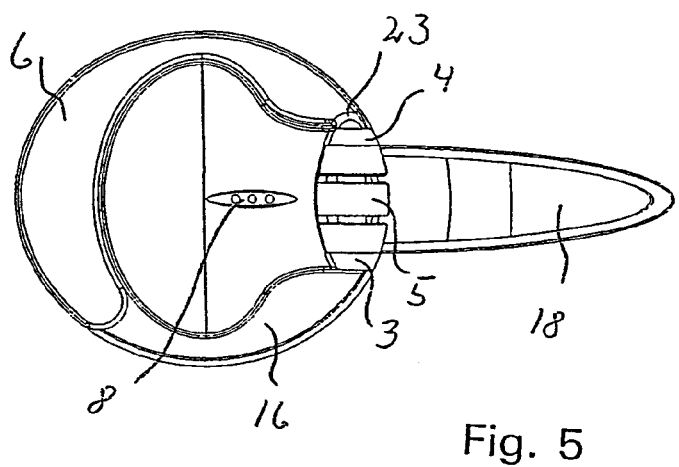
Figure 4:
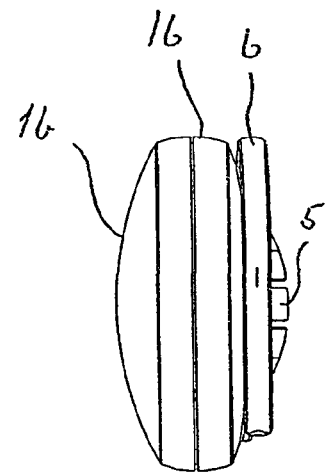
Figure 6:
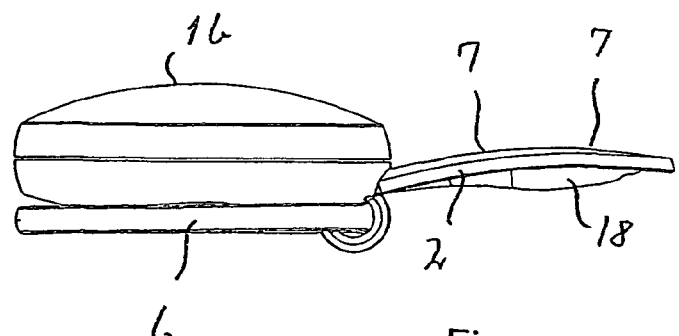
Figure 7:
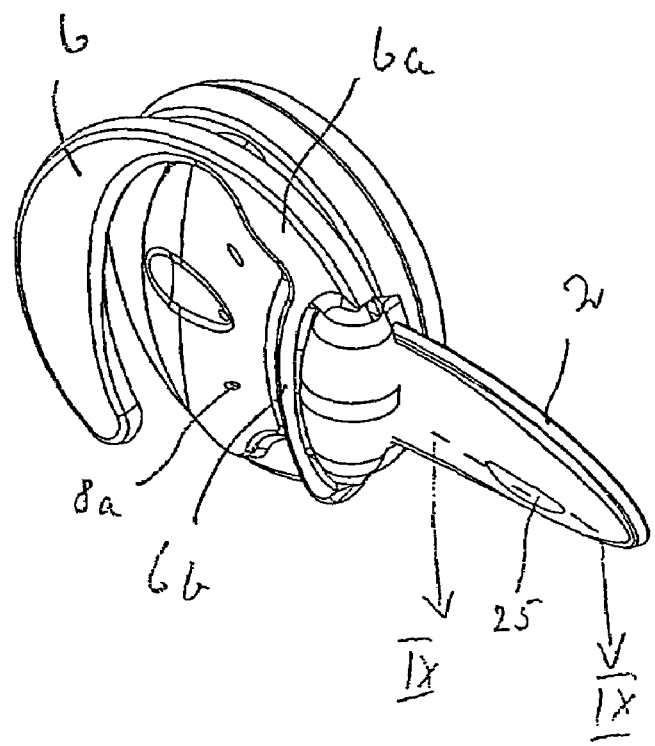
Figure 8:
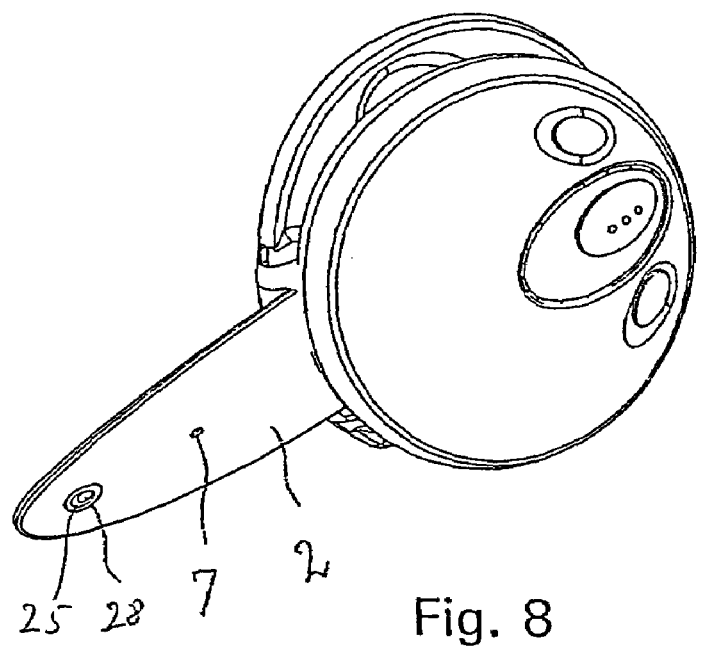
Figure 9:
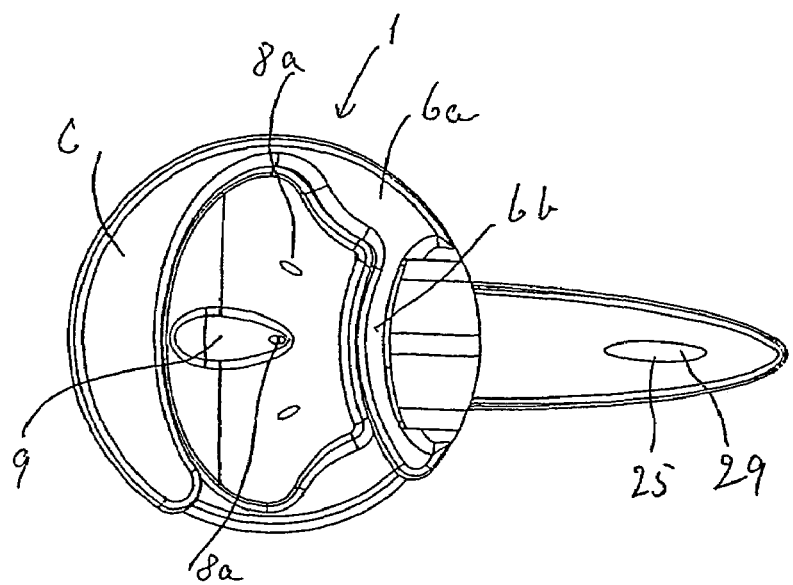
Figure 10:
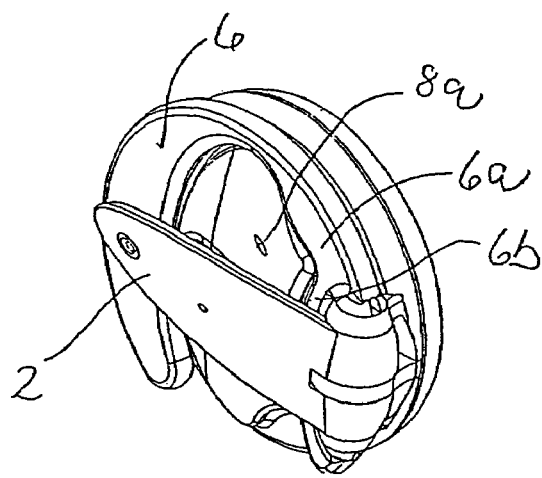
Figure 11:
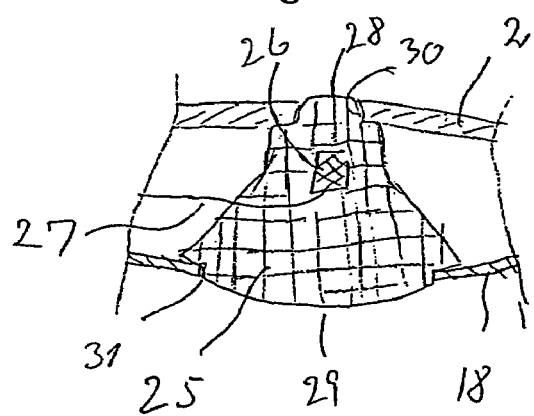

In the following, the invention will be described in more detail with reference to the drawings, where FIG. 1 shows an embodiment of the invention seen in perspective, FIG. 2 shows an exploded, perspective view of a second embodiment of the invention on a smaller scale, FIG. 3 shows an assembled version of the embodiment shown in FIG. 2, but similarly in perspective, FIG. 4 shows the same embodiment seen from the rear, FIG. 5 shows the embodiment shown in FIG. 3 seen from the side, FIG. 6 shows the same embodiment seen from above, FIG. 7 shows another embodiment of the invention seen in perspective and on a scale corresponding to FIGS. 3-6, FIG. 8 shows the same embodiment as in FIG. 7, but seen from the opposite side, FIG. 9 shows the same embodiment as in FIG. 7, but seen directly from the side, FIG. 10 shows the same embodiment as in FIG. 7, but with ear hook and microphone arm folded in, and FIG. 11 shows a plane section in the microphone arm in FIG. 7, seen in the direction IX-IX and on a much larger scale.

An embodiment of a communication unit according to the invention is shown in perspective and in its state of use in FIG. 1, and as will be seen the unit consists of a housing, which is indicated in general by the reference FIG. 1. This housing is configured as a flat capsule with slightly convex side surfaces, i.e. an inner side surface 1a and an outer side surface 1b, and with an annular edge surface 1c, which is similarly slightly convex. The extent of the side surfaces of the housing is of the same order as or less than an ear, so that the housing can easily be worn by a user without any inconvenience.

A microphone tongue or microphone arm 2, as it is also called in the following, is extending out from the housing, and this microphone arm is secured to the housing by means of two hinge pins 3 and 4 which are integrated parts of the housing 1, and which extend from the side surface 1a in the vicinity of the edge surface 1c or in the interface area between these two surfaces. Between the two hinge pins 3 and 4 a hinge part 5 of the microphone arm 2 is disposed, so that the microphone arm can be turned approx. 180° in towards the housing 1. As shown, the microphone arm 2 has openings 7, so that a transducer such as a microphone, a sound tube or the like in the microphone arm 2 can receive audio signals. When the transducer placed in the microphone arm is a sound tube, and which carries the audio signals further, these signals can possibly be fed further to a transducer such as a microphone, which is placed in the housing 1. As shown, the openings 7 are preferably configured in that side of the microphone arm 2 which faces away from the face of the user when in the position of use, whereby a suitably high accessibility is achieved for the audio signals to the transducer in the microphone arm 2.

Moreover, an ear hook 6 is secured to the housing 1, in that this ear hook can be secured to the housing in a pivotal manner by means of the hinge pin 4. The ear hook can thus be turned at an angle out from the side surface 1a, so that the communication unit can be placed on the ear of a user. Finally, it will be seen in FIG. 1 that in the side surface 1a openings 8 are provided, which stand in connection with a transducer or loudspeaker in the housing 1.

FIG. 2 shows an exploded view of a communication unit according to the invention on a slightly smaller scale and of a slightly changed embodiment. As will be seen, the housing is made up of two shells, i.e. an outer shell 11 and an inner shell 12. Between these two shells an intermediate plate 13 is placed, which can support electrical circuits and components. A transducer 14 is placed between this plate 13 and the inner shell 12, and a battery 15 is placed on the other side of the intermediate plate 13. Components other than those shown or described can naturally be placed in the same manner on or between the shells and the intermediate plate. Similarly, in or on the housing 1 an antenna (not shown) can be placed for use in the wireless transmission of signals to or from the communication unit. This antenna can be placed on a print board in the housing 1 or can be configured as an electrically conductive coating on another part of the housing, for example on the inner side or the outer side of the outer shell 11 or the inner shell 12.

The battery 15 can be one of several different battery types. However, this will mainly involve primary cells or batteries built up of primary cells, which will thus have to be replaced, or use can be made of secondary cells or secondary batteries, which will thus have to be recharged, which can be effected in various known ways.

The batteries involved can also be of the kind, which, depending on the constructive configuration of the housing 1, can be categorised as replaceable or as built-in. In the first case these can be batteries or cells which cannot be recharged, but which can be replaced directly by the user, e.g. via a commonly-known battery cover or battery flap, or they can be rechargeable batteries which can be removed by the user for charging in a battery charger. In the latter case, i.e. with built-in batteries, these can be of the type which are not rechargeable, and which cannot be replaced directly by the normal user, but which must be replaced e.g. during a service inspection, whereby it is ensured that the communication unit receives regular service. Alternatively, the battery can be of a rechargeable type, which is recharged e.g. by means of a plug connection or by means of electromagnetic energy transfer.

Finally, while making use of different types of materials, the battery 15 can be configured for the electrically active components. For example, use can be made of NiCd batteries, NiMH batteries, Li-ion batteries or Li-polymer batteries. The selection can be made especially with regard to energy content per volume, in that it is important out of regard for the confined conditions inside the housing 1 to make use of a battery, which with a given energy content has a minimum size. Similarly, it can be expedient to use batteries such as e.g. Li-polymer batteries which are flexible in form, and which can be adapted to a given shape, so that the choice is not restricted to conventional battery shapes, whereby the placing in the housing 1 can be effected more easily and expediently while retaining a desired small volume.

Along the edge in the inner shell 12 a depression or recess 16 is provided, which in shape corresponds to the ear hook 6, and between the two hinge pins 3 and 4 there is a depression 17, which corresponds to the shape of the hinge part 5 on the microphone arm 2.

As shown, the microphone arm 2 has a shell part 18, which is mounted against the inner side 20 of the arm, in which inner side the two apertures 7 open out. The shell part 18 serves to form a compartment in which a transducer 19 such as a microphone or a sound tube can b accommodated. Moreover, in the cavity in an embodiment of the invention an antenna can be provided, which can be configured as metal or other electrically suitable coatings (not shown) on the inner side 20 of the microphone arm. The electrical connection from the antenna to the electrical circuits in the housing 1 can be effected via the hinge parts 3, 4 and 5. Electrical conductive coatings can thus be provided on the axial end surfaces 21 and/or 22 of the hinge part 5, and on the corresponding surfaces on the hinge pins 3 and 4, so that the necessary electrical connection is achieved when the hinge is assembled. Finally, there will be electrical connections from the microphone 19 to the housing 1, which can be achieved by means of flexible conductors which are led via the hinge, e.g. via the annular recesses shown on the hinge part 5, or by means of other forms of connections, for example spring or slide contacts between the housing 1 and the microphone arm 2.

Because of the relatively short length of the microphone arm, the microphone unit 19 placed in the microphone arm 2 can expediently be configured as a unit with a high degree of directivity, for example so that audio and speech signals from the mouth of the user are intercepted by the microphone, whereas sounds which come in from other directions are not registered or are intercepted only to a lesser degree.

The ear hook 6 is further configured with a securing part 23 which, for example, consists of a pin or the like which can enter into engagement with a corresponding socket part in the upper hinge pin 4, so that the ear hook 6 can be turned through an angle. The ear hook 6 can in the same way be secured to the lower hinge pin 3 by means of the securing part 23, and in this position the ear hook can also be accommodated in the recess or the depression 16. The communication unit shown can thus be used for both the left and the right ear of the user, in that depending on the use for either the left or the right ear, the ear hook 6 can be placed respectively on the upper 4 or the lower 3 hinge part shown in FIG. 2. As will be seen, the microphone arm 2 and the remaining external parts of the communication unit are configured in a substantially symmetric manner around a centre plane, so that the communication unit can be used for placing both on the left or the right ear, solely by changing the ear hook 6 from the upper mounting to the lower mounting or vice versa.

Finally, it is shown in FIG. 2 that in the depression 17 for the accommodation of the hinge part 5, an activating part 24 for a switch or contact can be placed, so that the position of the microphone arm 2 can be sensed, which will be explained later.

In FIGS. 3, 4, 5 and 6, the communication unit shown in FIG. 2 is shown in the assembled state and from various angles. As will be seen, the housing in this configuration is slightly oval when seen from the side, but it is obvious that other suitable configurations can be chosen, such as circular, egg-shaped, partly linear or compositions of these shapes. The essential factor in this connection is that the shape is such that the communication unit is easily stored, and such that the microphone arm 2 and the ear hook 6 can lie closely up against the housing.

As will be seen in FIGS. 4 and 5, the communication unit is relatively flat, and the compact configuration without projecting parts is retained when the ear hook 6 is turned into the recess 16, and when the microphone arm 2 is folded in against the side surface 1a of the housing 1. Due to its shape and its short length, in this position the microphone arm will lie closely up against the housing, so that the communication unit will have the shape of a capsule or the like which occupies only very little space, and which can easily be stored or transported in a bag, a pocket or the like.

In association with the microphone arm 2, resilient or similar mechanisms (not shown) can be established which can secure the microphone arm 2 in the fully folded-in and/or fully folded-out position, so that the microphone arm will normally remain in this or these positions during normal conditions of use.

The communication unit can be configured as an ordinary earset provided with an electrical connection, but can in particular be configured as a wireless unit which contains the necessary circuits and components, such as an antenna as mentioned, for the necessary communication with a base station, a telephone network, a mobile telephone, a PC or similar equipment, with which speech and sound are exchanged. By this communication, use can be made, for example, of known short-distance forms of communication, such as e.g. the so-called "Bluetooth" technology. For use in a wireless manner, it is important to limit the current consumption, so that the built-in battery 15 can supply the communication unit with current for an adequate length of time between battery replacements or recharging. For this purpose, the activation part 24 discussed in connection with FIG. 2 can serve instead of or in addition to an ordinarily used switch (not shown) which can be placed on the housing 1, and which must be operated manually. The activation part 24 can thus serve to cause a disconnection of the current supply when the microphone arm 2 is folded in against the housing 1, and conversely to connect the current supply when the microphone arm is folded out when the communication unit is taken into use. It is hereby prevented that a commonly known switch, which can be placed e.g. on the housing, can be activated accidentally e.g. when the unit is placed in a pocket, whereby current will be consumed. Because of the length of the microphone arm and the way in which the arm is folded out, with the arrangement described an accidental connection can arise only when there is sufficient room in the relevant storage place for the microphone arm 2 to fold out.

In order to prevent an unintentional activation also in such a case, the unit can further be provided with a locking arrangement (not shown) which secures the microphone arm in the folded-in condition, e.g. against a spring effect. It is not until this locking arrangement is released, for example by means of a release button (not shown) that the microphone arm can be folded out to the position of use, possibly under the influence of a spring force. A connection of the current supply can hereby also be effected by means of the activation part 24. Alternatively, a connection of the current can be effected if at the same time the release button serves as a switch or serves to activate a switch, so that the connection of the current takes place at the same time as the releasing of the microphone arm. The microphone arm can also be provided with a spring device, which seeks to retain the microphone arm in one of two stable positions, i.e. in the fully folded-in and the fully folded-out condition. Consequently, when the microphone arm is to be folded-out or folded-in, the user must first move it against a suitable spring force which possibly increases until an unstable position is reached, from which during the further movement the microphone arm will be moved completely or partly by a spring force, which will bring the microphone arm to the second of the stable conditions, and vice versa. Also with this embodiment, which can be effected by means of commonly known arrangements, the microphone arm will thus be locked or secured against unintentional movement of the arm away from the inactivated condition.

It will be obvious that the extent of the forces which have to be overcome in the folding-out and/or -in of the microphone arm 2 must be selected while taking into account the finger strength of the normal user, so that the operation can be effected without difficulty, but at the same time so that an unintentional folding-out or-in will not take place during normal conditions of use.

Another embodiment of the invention is seen in FIGS. 7-11 of the drawing, where for the parts, which are unchanged in relation to FIGS. 1-6, the same reference numbers are used. It is seen in FIGS. 7-10 that the sound openings 8a to the built-in transducer or loudspeaker are placed in a slightly different manner, and that a cavity 9 for acoustic adjustment is displaced slightly rearwards in comparison-with the embodiment shown in FIGS. 1-6. Apart from these differences, the housing 1 is configured in substantially the same way as in the embodiment in FIGS. 1-6.

On the other hand, the ear hook 6 has been changed, in that via a connection part 6a it is configured as an integral part of a bridge part 6b, so that in this way the ear hook 6 can enter into engagement with both of the hinge pins, i.e. it can enter into engagement on both sides of the hinge 5. This results in a more rigid construction and a longer acoustic path from the sound openings a from the transducer in the housing 1 to the sound opening 7 in the microphone arm for microphone or sound tube. The risk of coupling is hereby minimised.

The most important changes in comparison with the embodiment in FIGS. 1-6 involve the microphone arm 2, and in this connection reference is made especially to FIGS. 8, 9 and 11. The changes namely involve the addition of a signal device in the form of a miniature light diode 26 or the like, which via leads 27 can be made to signal whether a conversation is in progress, or whether the unit is switched on or off. It is preferred that use is made of a miniature light diode 26, in that such a device has minimal current consumption, but there is naturally nothing to prevent use being made of other forms of light sources. The light diode 26 can be placed in an item 25 of rubber as shown in FIG. 11, e.g. of transparent or partly transparent rubber material which the light diode can illuminate or shine through. Hereby an illuminating surface 28 appears, e.g. in the vicinity of the sound opening 7 for the microphone or sound tube on the outside of the microphone arm 2. From FIG. 11 it will be seen that an opening 30 is provided in the microphone arm 2, and an opening 31 in the shell part 18, and that the item 25 is configured in such a manner that it sits firmly with a clamping effect in the cavity between the two parts. On the inwardly-facing side of the microphone arm 2, i.e. on the outwardly-facing side of the shell part 18, by suitable configuration of the item 25 a forwardly-facing surface 29 can be provided which can expediently serve as a soft stop when the microphone arm 2 is folded all the way in as shown in FIG. 10. In FIG. 11 it is shown how the light diode 26 can be placed inside the rubber item 25 itself. It will be obvious to those familiar with the art that this positioning is only an example of how the light source can be configured. In the example shown, the direction of the light emission from the diode 26 will be towards the surface 28, so that the whole of the surface will be illuminated when the light diode is activated. In this way, the light diode sits well protected inside the rubber item.

It will be obvious to those familiar with the art that embodiments other than those shown and described can be considered, and that these embodiments will lie within the scope of the subsequent claims.

It will thus be obvious that the communication unit can be used for other than wireless purposes, where a cable link to the unit must thus be established. Moreover, it is obvious that use can be made of means other than an ear hook for the fastening of the communication unit to the head of a user, in that e.g. an ear ring or a headband can be used, merely providing that these parts can be folded in against the housing when the unit is not in use.

Finally, it is obvious that the parts, which constitute the communication unit, can be configured from materials suitable for the purpose, such as synthetic and plastic materials, and that certain parts can be made of suitable metals.

The invention claimed is:

1. Communication unit comprising a housing in which at least one transducer is placed, and on which a microphone arm is suspended, said communication unit being secured to the head of a user by an ear hook, and in that the microphone arm is pivotally connected to the housing by a hinge link at an outer area of the housing, said hinge link having a pivot extending at least from said earhook to the microphone arm and upon which both the ear hook and microphone arm pivot said pivot located toward the edge of the housing and oriented substantially tangentially thereto, and such that the microphone arm can be moved between a first position in which it lies adjacent the housing, and a second position in which it extends away from the housing, and wherein said pivot is adjacent the peripheral edge of the housing and in a generally tangential relationship thereto.

2. Communication unit according to claim 1, wherein the microphone arm is pivotally connected to the housing in such a manner that an axis of rotation for the microphone arm is lying in a plane which is substantially parallel with at least a part of a side surface for the housing.

3. Communication unit according to claim 2, wherein the signal arrangement is placed on the microphone arm.

4. Communication unit according to claim 3, wherein the signal arrangement is encapsulated in an item of relatively soft material, said item reaching out to the upper surface of the microphone arm via at least one opening, and possibly extending a slightly further distance out over the surface.

5. Communication unit according to claim 1, wherein the microphone arm is connected to the housing by at least one hinge pin which extend out from a side surface of the housing, and that a first end part of the microphone arm has a hinge part which corresponds to and is disposed between at least one hinge pin.

6. Communication unit according to claim 5, wherein the ear hook, the ear ring is pivotally connected to the housing, preferably by the hinge pins on the housing, and that the housing preferably has a recess corresponding to the ear hook or the ear ring.

7. Communication unit according to claim 6, wherein the fastener of said communication unit to the head of a user can be pivotally connected to the housing in at least two positions, whereby the communication unit can be worn by a user on either the right or the left side of the head.

8. Communication unit according to claim 7, wherein it further comprises a signal arrangement for optical signaling.

9. Communication unit according to claim 6, wherein the ear hook is configured integral with a bridge part which extends over the hinge pins and the hinge part, and is in engagement with the hinge pins.

10. Communication unit according to claim 1, wherein said pivot is at least a partial shaft from said microphone arm to said ear hook.

11. Communication unit according to claim 1, wherein a microphone is built into the communication unit in which case the electrical connections to this microphone are effected via the hinge link.

12. Communication unit according to claim 1, wherein the communication unit is configured for wireless communication, and that the communication unit supports an antenna for wireless communication, which antenna is supported by the housing.

13. Communication unit according to claim 12, wherein the antenna comprises a coating on a surface on the housing.

14. Communication unit according to claim 12, wherein the electrical connection to the antenna is effected via the hinge link via electrically conductive coatings on at least one hinge pin and the hinge part of the microphone arm, respectively.

15. A wearable headset communication unit comprising a housing, a pivot, a microphone arm pivotally connected to the housing by a hinge link rotatablable on said pivot, said pivot located generally proximate the edge of the housing and oriented substantially tangentially thereto, said ear hook being pivotally connected to said housing by a hinge link rotatable on said same pivot with said pivot extending through the body at least from the earhook to the microphone arm, such that the ear hook and microphone are movable between a first position in which the inner surface lies adjacent the housing, and a second position in which it extends away from the housing.

16. A compact headset communication unit wearable on and supported by a users ear comprising a housing having a first surface having at least one transducer thereon, a pivot, and a microphone arm suspended from said housing said microphone having longitudinal dimension, said housing having an outer peripheral edge which defines a boundary of the housing, and also having an earhook for securing the communication unit to the head of a user, said earhook pivotally extending from said housing, wherein the microphone arm and said ear hook are pivotable along the same pivot which extends at least between the ear hook and microphone arm, and pivotally connected to the housing by a hinge link on said housing by a pivot being generally parallel proximate said peripheral edge, such that the microphone arm and said ear hook being moveable between a first folded position, and a second open position in which it unfolds extending away from the housing.

17. A communications unit according to claim 16 wherein the microphone arm is of a length such that, when said microphone arm is in said folded position, a compact unit is formed with the microphone is not longer than said longitudinal dimension.

18. Communication unit according to claim 16, wherein face of the housing lies generally in one plane, and wherein the microphone arm is pivotally connected to the housing in such a manner that the microphone arm is capable of rotating on said hinge link through a plane which is generally orthogonal to said one plane as it is moved from a closed to an open position.

* * * * *